Patented Aug. 10, 1954

2,686,147

UNITED STATES PATENT OFFICE 2,686,147

PRODUCTION OF DEXTRANSUCRASE

Henry M. Tsuchiya and Harold J. Koepsell, Peoria, Ill., assignors to the United States of America as represented by the Secretary of Agriculture No Drawing. Application November 15, 1951, Serial No. 256,586

8 Claims. (Cl. 195—66)

(Granted under Title 35, U. S. Code, (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the preparation of a polysaccharide-producing enzyme, and more particularly, to the production of enzyme compositions and liquors containing the enzyme composition which are capable of converting sucrose into the polysaccharide, dextran.

According to the invention of Koepsell et al., disclosed and claimed in Ser. No. 215,623, certain microorganisms, heretofore known to produce dextran, levan, and mixtures thereof, from sucrose media, can be cultivated in such a way that culture liquors are obtained rich in polysaccharide-producing enzymes. The enzymes, either in situ in the fermentation liquors, or isolated as such, are capable of converting sucrose into dextran. This method may be termed cell-free or purely enzymic production of the polysaccharide.

According to the prior invention, the enzyme-producing organisms are cultured in a sugar medium where the production of the dextran itself is minimized, and maximum production of the enzyme, dextransucrase is realized.

We have discovered that the time required for the production of maximum yields of the enzyme may be considerably reduced by proper control of culture conditions, particularly the hydrogen ion concentration. We have, moreover, discovered that considerably increased yields of the enzyme may be effected by hydrogen ion concentration control. Utilizing our discoveries, we are able to produce the dextransucrase enzyme in about one-fourth or less of the time previously required and, in addition, the yields are 3 to 5 times greater.

An essential feature of our invention is control of the hydrogen ion concentration throughout substantially all of the enzyme-producing fermentation within the limits of about 6.0 to 7.0. This results in maximum enzyme production in a period of 12 hours or less, and therefore is a distinct improvement over the previous method of Koepsell et al. which required up to 48 hrs. for enzyme production alone. With the added advantage of reduced time and increased yields, as previously noted, our present invention possesses all the advantages that attend the prior invention of Koepsell et al.

Our method varies in yet another phase from that of the Koepsell et al. invention. In that prior application, there is disclosed the use of low sucrose levels, the amount being not substantially greater than necessary to promote cell growth of the dextransucrase producing bacteria.

We have found that, according to our invention, it is not necessary to restrict the initial amount of sucrose as in the prior application. We have found that limited amounts of dextran present in the enzyme liquor are not detrimental, provided the bacterial cells may be effectively removed from the final liquor. Therefore, any concentration of sucrose may be used, so long as the resulting final medium, after enzyme production, is not so viscous as to prevent separation of the cells by ordinary means. In actual practice, the amount of sucrose may vary over a considerable range, the amount, in most cases however, being somewhat less than the amounts employed in the whole culture synthesis of dextran.

The maximum amount of sucrose made available to the organism, according to our invention, may also vary with the particular organism. This is true for the reason that the dextran-producing organisms vary in the character of the dextran product, and the variance is manifested particularly noticeably in the viscosity of aqueous solutions of the dextran. Some organisms, as for example Leuconostoc mesenteroides NRRL B—742, may be given as high as 5 percent or more sugar in the medium during the enzyme production without producing a culture liquor of undesirable viscosity.

According to our experience, it is preferable to use as much sucrose in the enzyme synthesis medium as will permit separation of the cells. Within a range of 1 to 5 percent sucrose or higher, we have discovered that high enzyme yields are realized with higher sugar concentrations, and we prefer to use the higher concentrations, the upper limit being governed only by the ease with which the bacterial cells may be separated. Cell separation may be accomplished by a variety of methods with which the art is familiar. For instance, the cells may be filtered or centrifuged from the medium. Example 5 illustrates the effect of sucrose concentration on the yield of dextransucrase.

Our discovery that maximum yield and maximum speed of enzyme formation occur at an optimum hydrogen ion concentration of pH 6 to 7 is surprising, especially in view of the stability characteristics of the enzymes. Prior workers have found that dextransucrase and similar enzymes possess maximum stability at pH 4.3 to 5.5, whereas at pH 6 to 7 these enzymes are appreciably unstable. As a consequence, under the conditions of our fermentation, namely, with temperatures of 20°–35° C. and hydrogen ion concentrations maintained at pH 6 to 7, it is necessary to harvest the enzyme, by separating the bacterial cells, without substantial delay after the maximum has been reached, or adjust this pH to 4.8 to 5.5. If this is not done, the enzyme tends to decompose and the yield of enzyme is lessened.

The hydrogen ion concentration of the enzyme-producing fermentation, according to our invention, may be controlled within the limits of 6.0 to 7.0 by various means. For example, we may employ buffers, such as the well-known phosphate type of buffer. We may also add periodically sufficient amounts of soluble alkali to maintain the desired pH. The latter method may be accomplished by the use of automatic pH controlling devices, and we prefer it for plant scale fermentations, since addition of foreign material to the fermentation medium is minimized.

Control of pH by means of buffers is convenient, and this method is frequently resorted to in the art. Buffers which may be used to maintain the pH within the range of 6 to 7 are, for example, the well-known phosphate buffers, citrate buffers, bicarbonate buffers, and the like. The selection of the particular buffering agency is principally a matter of choice, and suitable buffering agencies will readily occur to those skilled in the art.

Caution must be observed, however, for effective buffering. The pH tends to vary and will be outside the desired range unless proper amounts of buffer are used. It is necessary to use at least the minimum amount required to control the pH within the designated range for a period of time that will afford prolonged enzyme synthesis. This point is illustrated in Examples 1, 3 and 4 which follow, where varying amounts of potassium phosphate are used to buffer the synthesis media. In each series of flasks, the pH fell below the designated range, with consequent decreases in enzyme yield when insufficient quantities of buffer were used. In the examples cited, it was found that at least 1 percent phosphate buffer was adequate. The particular amount of buffer, however, that is required to maintain the pH within the designated range depends largely upon the composition of the medium. The actual amount necessary for any particular fermentation can be readily determined by simple known methods. The effect of adequate buffer is to maintain the pH within the range for a period of time sufficient to afford net increased enzyme production.

With this buffering method of pH control, or any method where the final pH tends to remain static, it is important to remove the produced enzyme from an environment of pH above about 5.5 without delay. This may be accomplished either by harvesting or by pH adjustment as previously explained.

The mineral and assimilable nitrogen requirements for our fermentation are essentially those familiarly encountered in the art for the production of dextran. For example, we may employ any of the usual sources of assimilable nitrogen, such as ammonium salts, urea, protein or proteinaceous materials, such as yeast extract, corn steeping liquor, distillers' solubles, soy meal products, and the like. The following specific examples illustrate the invention.

EXAMPLE 1

A culture medium was composed as follows:

|  | Percent |
|---|---|
| Sucrose | 2.0 |
| Corn steep liquor solids (dry basis) | 2.0 |
| R salts (by volume) | 0.5 |

The R salt solution was made up as follows:

| | | |
|---|---|---|
| $MgSO_4 \cdot 7H_2O$ | g | 4.0 |
| NaCl | g | 0.2 |
| $FeSO_4 \cdot 7H_2O$ | g | 0.2 |
| $MnSO_4 \cdot H_2O$ | g | 0.2 |
| $H_2O$ | ml | 100.0 |

Five flasks of this medium were made up, and increasing amounts of $KH_2PO_4$ were added as follows:

|  | Percent |
|---|---|
| Flask A | 0.25 |
| Flask B | 0.5 |
| Flask C | 1.0 |
| Flask D | 1.5 |
| Flask E | 2.0 |

The pH of each flask was adjusted to 7.2, and all were inoculated with Leuconostoc mesenteroides NRRL B-512. The flasks were shaken for 24 hrs. at 25° C. The cells were then separated and the culture liquors assayed for dextransucrase. The amount of dextransucrase present was measured as dextransucrase units, i. e., the amount of dextransucrase which will convert 1 mg. of sucrose in one hour, per ml. of solution. The dextransucrase units per ml. of the 5 flasks were determined to be as follows:

| | |
|---|---|
| Flask A | 0.7 |
| Flask B | 15.1 |
| Flask C | 50.6 |
| Flask D | 69.6 |
| Flask E | 97.2 |

EXAMPLE 2

Four 12-liter culture media were made up containing the same amount of sucrose and corn steep liquor and R salts as in Example 1. To each was added 0.1 percent $KH_2PO_4$. The media were inoculated with the same organism used in Example 1 and were aerated at 0.05 volume of air per volume of culture per minute at 25° C. One culture was maintained at pH 6.1, the second at pH 6.4, the third at pH 6.7, and the fourth at pH 7.0 by the addition of 5N NaOH solution. The first culture gave a maximum yield of 30.0 devtransucrass units per ml. at the end of 6 hrs. The other three cultures gave their maximum yields at the end of 8 hrs., the values being 44.0, 53.6, and 41.6 dextransucrase units per ml., respectively. In all cases, the yield of dextransucrase dropped shortly after the maximum had been attained. The decrease in enzyme content can be arrested by harvesting immediately or by adjusting the cultures to pH 5.0 to 5.5.

EXAMPLE 3

Example 1 was repeated except for Flask A, substituting 2 percent distillers' solubles for the corn steep liquor of that example. The fermentation was conducted without shaking the flasks. The dextransucrase yields per ml., determined at the end of 24 hrs., were as follows:

| | |
|---|---|
| Flask B | 27.5 |
| Flask C | 32.9 |
| Flask D | 37.8 |
| Flask E | 36.7 |

EXAMPLE 4

Example 1 was repeated substituting *Streptobacterium dextranicum* NRRL B-1255. The yields in dextransucrase units per ml. were as follows:

| Flask | Units |
|---|---|
| Flask A | 13.4 |
| Flask B | 17.8 |
| Flask C | 26.2 |
| Flask D | 37.7 |
| Flask E | 19.2 |

EXAMPLE 5

Example 1 was repeated using 2 percent potassium monobasic phosphate as buffer. In this example, the sucrose concentration was varied, and a series of flasks was made up each containing the designated amount of sucrose. The results are tabulated below.

Table I

| Sucrose, percent | Dextransucrase units per ml. |
|---|---|
| 0.5 | 5.7 |
| 1.0 | 17.0 |
| 2.0 | 86.0 |
| 3.0 | 99.0 |
| 4.0 | 110.0 |
| 5.0 | 120.0 |

Instead of the organism employed in the foregoing examples, we may likewise use any organism of the genera Leuconostoc, Aerobacter, Streptobacterium, Betabacterium, Bacillus, Lactobacillus, Streptococcus and the like, known to produce the polysaccharides, dextran, levan, or mixtures thereof in aqueous culture media. The amount of sucrose may be varied, the upper limit being dictated by the viscosity of the final enzyme-containing liquor.

We claim:

1. The method of producing dextransucrase comprising culturing *Leuconostoc mesenteroides* in a nutrient medium comprising sucrose at a pH maintained within the range of 6.0 to 7.0 until a substantial amount of dextransucrase is produced in the culture liquor and substantially immediately altering the pH environment of the dextransucrase to not above 5.5 and not below 4.8, and separating the bacterial cells from the culture liquor.

2. The method of producing dextransucrase comprising culturing dextran-producing bacteria in a nutrient medium comprising sucrose, continuing fermentation at a pH within the range of 6.0 to 7.0 until substantial amount of dextransucrase is produced in the culture liquor and separating the bacterial cells from the culture liquor, said sucrose being in an amount which affords effective separation of the cells at the end of the fermentation.

3. The method of claim 2 in which the dextran-producing organism is selected from the group consisting of *Leuconostoc mesenteroides* and *Streptobacterium dextranicum*.

4. The method of claim 2 in which the pH is maintained within the range of 6.0 and 7.0 by means of a buffering agent.

5. The method of claim 3 in which the pH is maintained within the range of 6.0 and 7.0 by periodic addition of a soluble alkaline agent.

6. The method of claim 3 in which the bacteria is *Leuconostoc mesenteroides*.

7. The method of producing dextransucrase comprising culturing dextran-producing bacteria in a nutrient medium comprising sucrose, continuing fermentation at a pH within the range of 6.0 to 7.0 until a substantial amount of dextransucrase is produced in the culture liquor and subsequently altering the pH environment of the dextransucrase to not above 5.5 nor below 4.8, and separating the bacterial cells from the culture liquor.

8. The method of producing dextransucrase comprising culturing *Leuconostoc mesenteroides* in a nutrient medium comprising sucrose at a pH maintained within the range of 6.0 and 7.0 by means of a phosphate buffer until a substantial amount of dextransucrase is produced in the culture liquor and subsequently altering the pH environment of the dextransucrase to not above 5.5 and not below 4.8, and separating the bacterial cells from the culture liquor.

References Cited in the file of this patent

Hehre et al., Jour. Biol. Chem., 163 (1946), (article pages 221–233), pages 221–222.

Evans et al., Bacterial Polysaccharides, Sugar Research Foundation, Inc., N. Y., April 1947, Sci. Report Series No. 6, pages 211, 216, 217, 228 to 230.

Hehre et al., Jour. Bact., 55 (1948), pages 197–208. Pages specifically relied upon are 204–205.